US008831678B2

(12) United States Patent
Doyle

(10) Patent No.: US 8,831,678 B2
(45) Date of Patent: Sep. 9, 2014

(54) METHOD AND SYSTEMS FOR POWER SAVINGS BY CONTROLLING A FIRST RADIO BASED ON A SECOND RADIO

(75) Inventor: Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 13/411,517

(22) Filed: Mar. 2, 2012

(65) Prior Publication Data
US 2013/0035093 A1 Feb. 7, 2013

Related U.S. Application Data

(60) Provisional application No. 61/514,760, filed on Aug. 3, 2011.

(51) Int. Cl.
*H04W 36/00* (2009.01)
*H04M 1/00* (2006.01)

(52) U.S. Cl.
USPC ........ 455/552.1; 455/436; 455/437; 455/438; 455/439

(58) Field of Classification Search
CPC . H04W 36/00; H04W 52/00; H04W 52/0264; H04W 52/0209; H04W 88/06; H04W 36/0055; H04W 36/0061
USPC ...................... 455/436–439, 552.1
See application file for complete search history.

(56) References Cited

U.S. PATENT DOCUMENTS

| | | | | |
|---|---|---|---|---|
| 7,200,397 B1 * | 4/2007 | Jones et al. | ................... | 455/436 |
| 7,787,821 B2 | 8/2010 | Hamaguchi | | |
| 2008/0039132 A1 * | 2/2008 | Delibie et al. | ............. | 455/552.1 |
| 2008/0117019 A1 | 5/2008 | Kitani | | |
| 2009/0011773 A1 | 1/2009 | Balachandran et al. | | |
| 2009/0047991 A1 | 2/2009 | Elg | | |
| 2009/0168676 A1 | 7/2009 | Olson | | |
| 2009/0257752 A1 * | 10/2009 | Yeh et al. | ...................... | 398/115 |
| 2011/0105102 A1 | 5/2011 | Jutzi et al. | | |
| 2011/0115986 A1 | 5/2011 | Takezaki | | |
| 2012/0155385 A1 * | 6/2012 | Bencheikh | .................... | 370/328 |

FOREIGN PATENT DOCUMENTS

JP 2011055105 A 3/2011

OTHER PUBLICATIONS

International Search Report and Written Opinion—PCT/US2012/049651—ISA/EPO—Jul. 8, 2013.

* cited by examiner

*Primary Examiner* — Marisol Figueroa
(74) *Attorney, Agent, or Firm* — James T. Hagler

(57) ABSTRACT

The various embodiments provide methods, devices, and systems for conserving power by controlling a first radio based on a second radio. In various embodiments, the first radio may be generally on or periodically on, and in communication with or attempting to establish connections with a first radio network. The device may determine whether to energize or turn on a second radio to connect with a second radio network based on one or more connections or the absence of connections established by the primary radio. This determination may be further based on various factors, such as a beacon or identifier sent over a primary radio connection, information obtained from or regarding the first radio network, one or more data structures stored within the device, or previously recorded states of the device.

20 Claims, 14 Drawing Sheets

METHOD AND SYSTEMS FOR POWER SAVINGS BY CONTROLLING A FIRST RADIO BASED ON A SECOND RADIO

CROSS-REFERENCE TO RELATED APPLICATIONS

This application claims the benefit of priority to U.S. Provisional Patent Application Ser. No. 61/514,760 filed Aug. 3, 2011 which is hereby incorporated herein by reference in its entirety.

BACKGROUND

Cellular and wireless communication technologies have seen explosive growth over the past several years. The reduction in size and cost of wireless devices has opened new applications. Also, most smart phones now include both cellular and Wi-Fi transceivers providing users with a broader range of communication options. However, with this growth in the number and variety of communication capabilities has come an increased demand on communication device battery power. Thus, there is a need for methods and communication devices configured for reduced power consumption in order to extend battery life.

SUMMARY

The various embodiments provide methods, devices, and systems for conserving power by controlling a first radio based on a second radio. A primary radio may be generally on and attempting to establish connections. The device may determine whether to energize or turn on a secondary radio based on one or more connections or the absence of connections established by the primary radio. This determination may be further based on various factors, such as a beacon or identifier sent over a primary radio connection, one or more data structures stored within the device, or previously recorded states of the device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
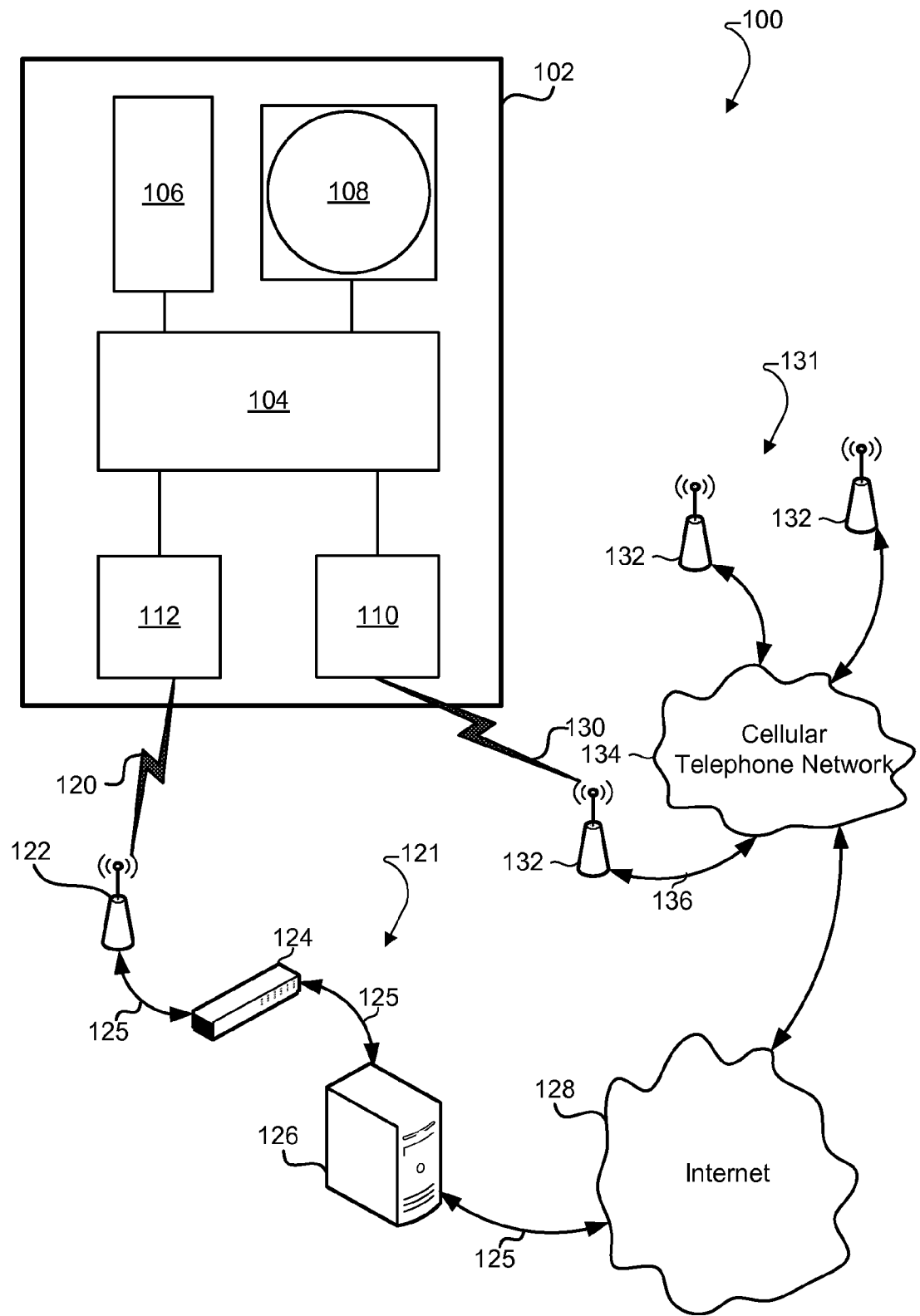
FIGS. 1A and 1B are communication system diagrams and component block diagrams illustrating communication devices with multiple radios.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "cell phone," "wireless device," and "communication device" are used interchangeably herein to refer to any one or all of cellular telephones, smart-phones (e.g., iPhone), web-pads, tablets, Internet enabled cellular telephones, Wi-Fi enabled electronic devices, personal data assistants (PDA's), laptop computers, personal computers, computers sending and receiving short message service (SMS) messages, multimedia message service (MMS) messages, and/or electronic mail (email) and similar electronic devices. The term "communication device" is also used to refer to a variety of wireless communication tags and tracking devices which may implement the various embodiments. However, the terms "cell phone," "wireless device" and "communication device" should not be limited to the enumerated list of devices.

Modern communication devices may incorporate multiple wireless radios, such as one or more cellular, Bluetooth, Wi-Fi, short range, or various other radios. Multiple radio sets may present a substantial drain on a communication device's limited power resources. This power drain may be unnecessary if some radios are searching for connections when none are available.

The various embodiments provide methods, devices, and systems for conserving power within a communication device by controlling a first radio based on information obtained by a second radio within the same device. A primary radio may be generally on and attempting to establish connections or maintain an established connection, such as a wireless network connection suitable for performing Internet protocol (IP) communications. Any information obtained by the primary radio may indicate whether a wireless connection is established, a wireless connection cannot be established, or a wireless connection is terminated. In various embodiments, the communication device may determine whether to energize or turn on a secondary radio based on one or more connections or the absence of connections established by the primary radio. This determination may be further based on various factors, such as a beacon or identifier sent over a primary radio connection, one or more data structures stored within the device, or previously recorded states of the device. In a further embodiment, the primary radio may receive a signal encoded with information that the communication device can use to automatically determine that the secondary radio should be turned on. Examples of such encoded information include identifiers of cellular radio network towers, SMS messages, electronic mail, etc.

The first and second radios may be configured to establish wireless communications links using a variety of communication protocols. In a first embodiment, the communication device is a cellular telephone (e.g., a smart phone), the primary radio is a cellular telephone transceiver, and the secondary radio is a Wi-Fi transceiver. Such communication devices will also typically include other secondary radios, such as a Bluetooth transceiver, which is not shown separately but would have the same general configuration as illustrated in FIG. 1A.

FIG. 1A illustrates a communication system 100 which includes an embodiment communication device 102 having two radios which communicate with two different types of wireless communication protocols. A communication device 102 may include a processor 104 coupled to a memory 106 and a power source, such as a battery 108. A first radio transceiver 110 may be coupled to the processor 104 and configured to establish communication links 130 with a first type of wireless network. A second radio transceiver 112 may also be coupled to the processor 104 and configured to establish communication links 120 with a second type of wireless network. Further embodiment devices may include additional radios. References herein to a "first radio", "second radio", "primary radio" and "secondary radio" are merely for convenience and ease of reference, and not to indicate or infer that one type of radio is more important than another or necessarily the "primary" radio within the communication device.

In a cellular telephone embodiment, the primary radio 110 may be configured to communicate with one or more cellular telephone wireless wide-area networks 131 by establishing communication links 130 with at least one of a plurality of cellular network towers 132. In various embodiments, the primary radio 110 may always be on to facilitate receipt of cellular phone calls. The cellular towers 132 may have connections 136 to a cellular network 134, which may also include a connection to the Internet 128.

In the cellular telephone embodiment, the secondary radio 112 may be configured to communicate with wireless local-area networks 121 (e.g., Wi-Fi). For example, the secondary radio 112 may be configured for transmitting and receiving data network signals 120 from/to a WLAN base station antenna 122. In this example, the Wi-Fi network 121 includes a base station antenna 122 coupled to a router 124 and a network server 126, all of which may be coupled by connections 125. As is typical today, the Wi-Fi network 121 may be coupled to another network such as the Internet 128.

Figure 1B:
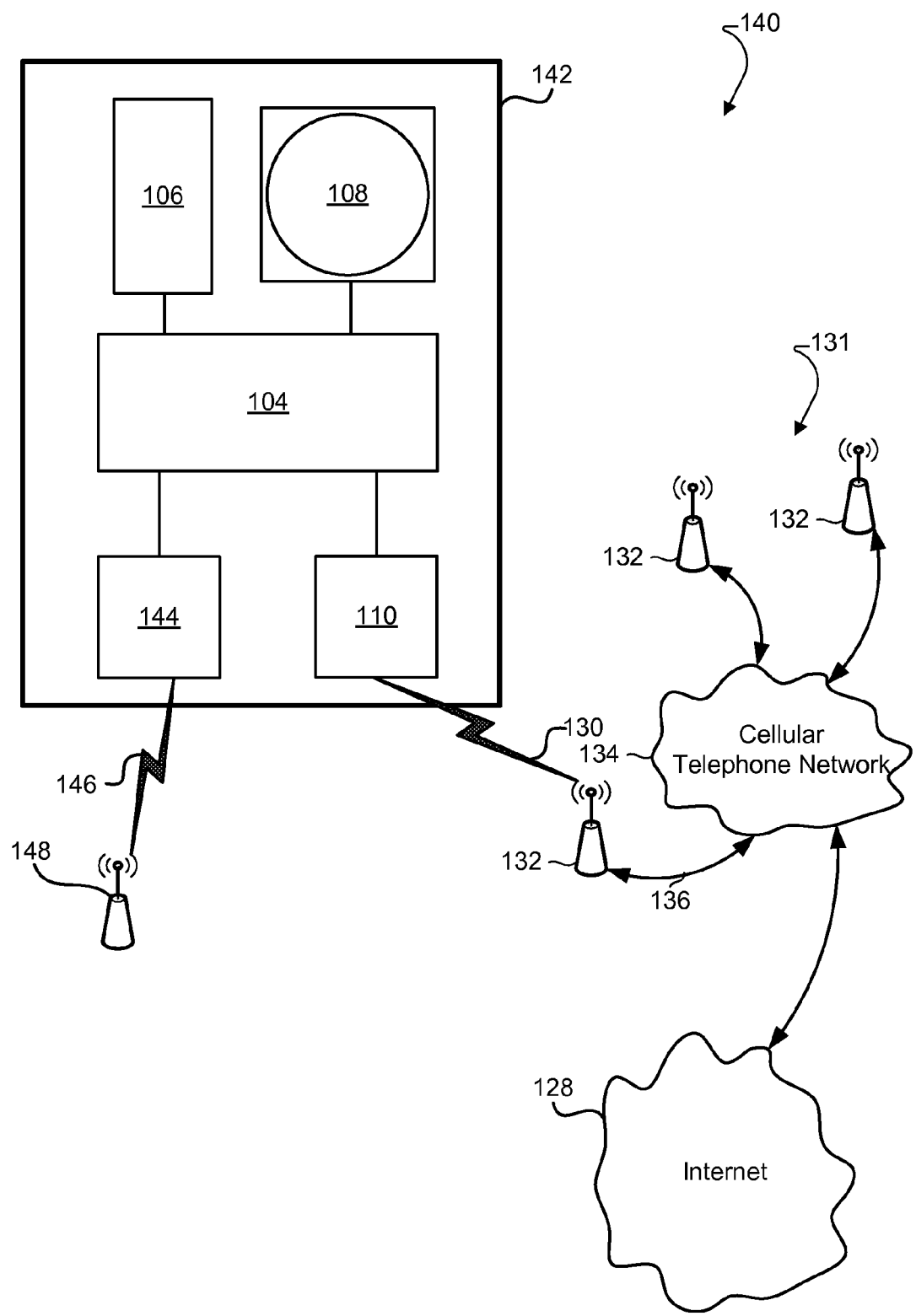

In a second embodiment communication network 140 illustrated in FIG. 1B, the wireless communication device may be an asset tracking device 142 configured to provide location and/or alarm messages to an owner of an asset (e.g., a valuable patent, construction equipment, etc.). In this embodiment, the primary radio 144 may be configured to listen for or communicate with a short-range local area beacon signal 146 that is transmitted by a local antenna 148. In some embodiments, the local antenna 148 is a standalone device whose function is to emit a simple beacon radio frequency (RF) signal that serves as a beacon with a limited range. In this embodiment, in which the wireless communication device 142 is an asset tracking device, the secondary radio 110 may be a cellular telephone transceiver configured to establish cellular data communication links 130 with a cellular network 131 via cellular network towers 132.

In this embodiment, the primary radio 144 coupled to the device processor 104 may be a radio receiver configured to receive beacon signals 146. Such beacon signals 146 may be short range, low power RF signals. These beacon signals may be emitted periodically or continuously. Also, there may be multiple beacon antennas 148, such as to define safe areas or to define a wider area of normal or expected position. The primary radio 144 may be configured to continuously listen for the beacon signal 146, or may be configured to periodically turn on in order to confirm that the beacon signal 146 is still receivable. If the asset tracking device 142 is removed from the coverage area of the beacon signal 146, the processor 104 may activate the secondary cellular telephone transceiver 110 in order to establish a communication link 130 with the cellular network 131. Position or alarm messages may then be transmitted via the cellular telephone network 131 to one or more cellular telephone numbers or to predefined Internet addresses via the Internet 128. Since the cellular telephone transceiver 110 (the secondary radio in this embodiment) will draw significantly more power from the battery 108, activating the cellular telephone transceiver 110 only when the beacon signal 146 is lost or no longer receivable by the primary radio 144 conserves battery power for when it is needed (i.e., to report and track a moving asset beyond the safe zone).

Figure 1C:
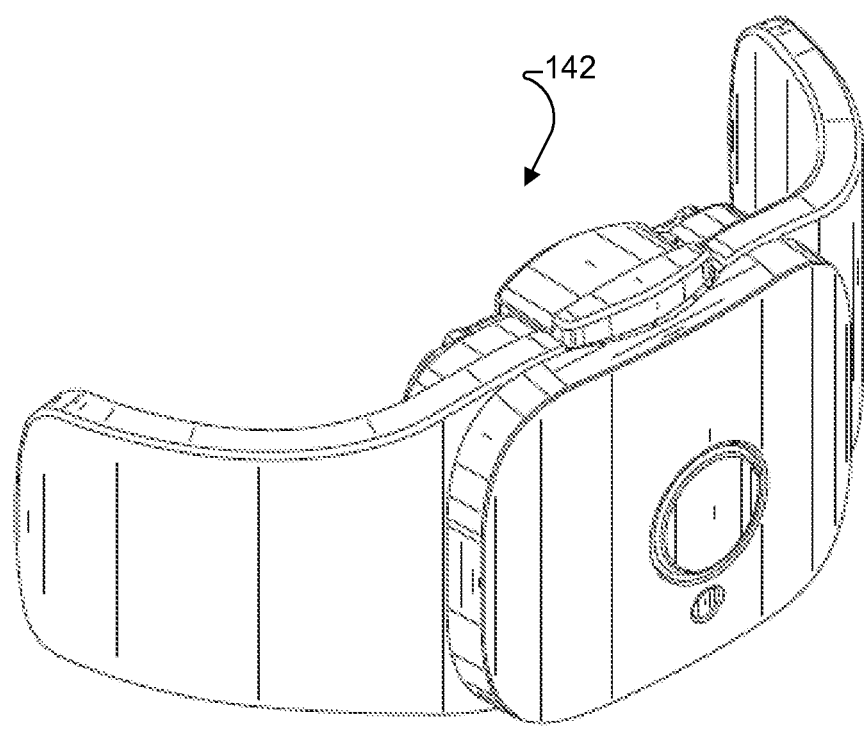
FIG. 1C is an illustration of an asset tracker communication device suitable for use with the various embodiments.

An example of an asset tracking device 142 in the form of a dog collar is illustrated in FIG. 1C.

Figure 2A:
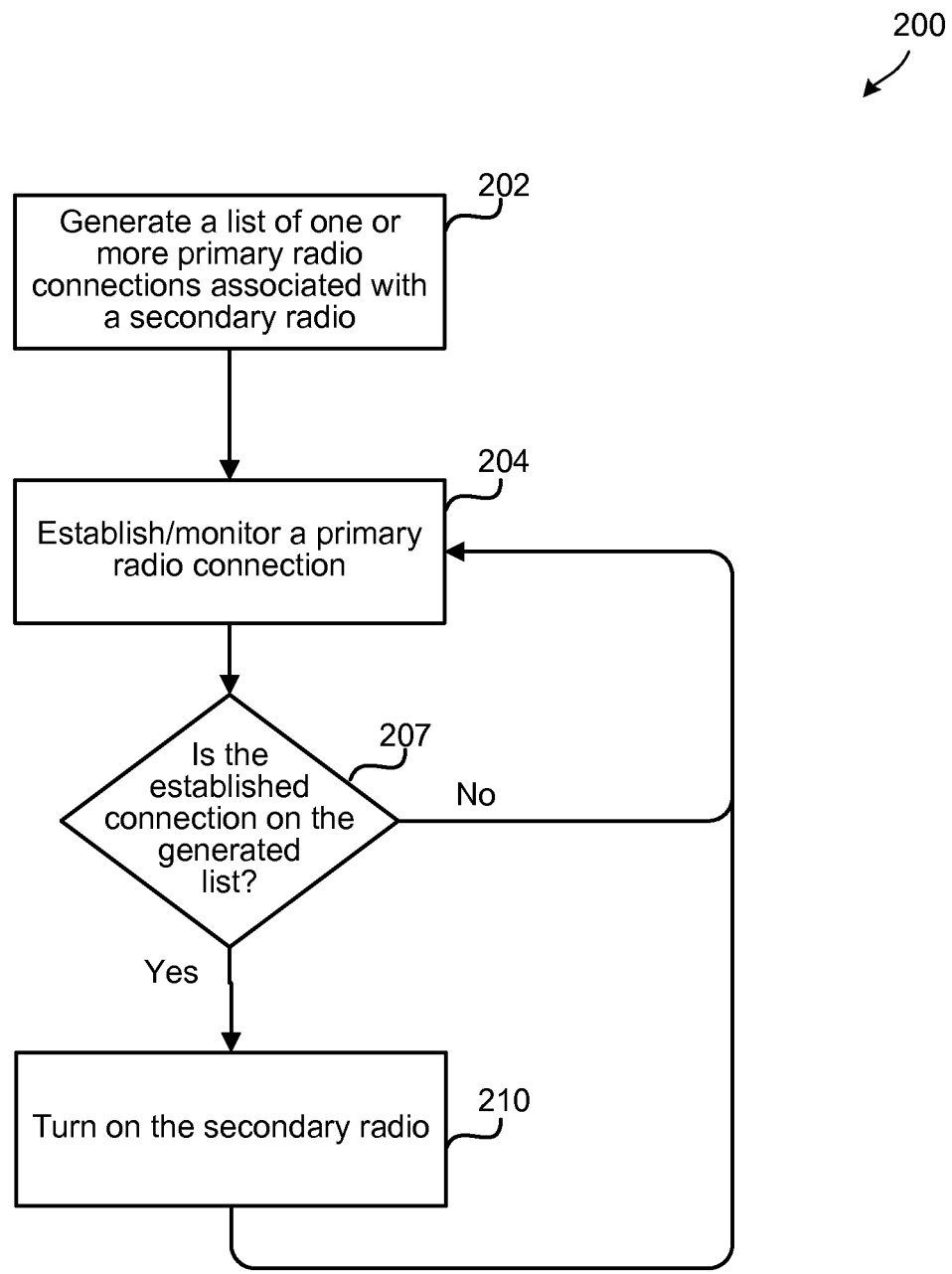
FIGS. 2A and 2B are process flow diagrams of two methods for controlling a secondary radio based on a primary radio in accordance with various embodiments.

FIG. 2A illustrates an embodiment method 200 for conserving power by activating the secondary radio 112 based on information received from a primary radio connection. In step 202, a data structure of primary radio connections 130 may be generated which correlates information received from the primary radio 110 (e.g., a cellular telephone power ID) with the availability or lack of availability of a secondary radio network. The primary radio connections 130 and the list are not necessarily associated with any individual secondary radio connection 120. For example, if any secondary radio connections are available when a particular primary radio connection is established, then the particular primary radio connection may be included in the list. If no secondary radio connections are available, then the particular primary radio connection may be excluded from the list. In the various embodiments, a variety of different types of data structures may be used to correlate the primary radio information with secondary radio networks, such as tables or arrays, but for simplicity a list is referred to herein. The primary radio information may be represented in various ways in the list. For example, the information may be an identifier unique to a connection 130 (e.g., a cell tower ID).

The list may be supplied by others (e.g., cellular or wireless network providers) and stored in memory, or generated based upon observed patterns. For example, the list may be generated by a cellular telephone by using machine learning methods to record primary radio connection 130 information when a secondary radio connection is available. By storing the primary radio ID, the generated list can be used to recognize when the secondary radio connection 120 may be available or established. In various embodiments, an identifier corresponding to the secondary radio connection may not be required. Instead, only the information that a secondary radio connection is typically available in the vicinity of the primary radio connection is necessary.

In step 204, a primary radio connection 130 may be established. In step 207, the communication device processor may determine if information from the primary radio connection 130 is on the list or stored in the data structure generated in step 202. This determination may be done various ways, such as a table lookup for an identifier for the connection 130 (e.g., the ID of the cell tower with which the primary radio connection 130 is established). In some embodiments, the information may be obtained from signals in the established connection.

Optionally, availability (or lack of availability) of secondary radios may be associated with availability of multiple primary radio signals. For example, the device might only have access to a secondary radio at a location where it is able to acquire a certain set of primary radios.

If the established connection information is on the list (i.e., determination step 207=Yes), then the secondary radio 112 may be turned on in step 210. If the established connection is not on the list (i.e., determination step 207=No), then the method may loop back to monitoring the established connection or establishing a next primary radio connection. Thus, the secondary radio 112 may be turned on or energized based on previous correlations between primary radio connections and the availability of secondary radio connections.

Activating the secondary radio based on information obtained from the primary radio may conserve power by allowing the secondary radio 112 to be de-energized when no secondary radio network is available. Also, the system may maximize availability of secondary radio connectivity without requiring persistent user intervention. For example, if a communication device 102 has previously been in an area with a primary radio connection 130 but with no secondary radio connections 120 available or allowed by a user, then the primary radio connection 130 may not be included on the list. Later, when the communication device is returned to the same area, the device processor can use the list stored in memory determine that the second radio 112 need not be turned on. This saves power that otherwise would be wasted searching for secondary radio connections when there are none available. However, when the communication device returns to an area where secondary radio connections were previously known to be available, a secondary radio connection may immediately and automatically be established without user intervention.

In some embodiments, the device may contain a parameter corresponding to a predetermined amount of time to wait before turning on the secondary radio to observe whether the primary radio connection is persistent. Otherwise, when a device is moving, it might turn on the secondary radio and soon thereafter lose the connection, therefore wasting the energy required to turn on the secondary radio and briefly establish the connection. The system may also store information in the black lists and white lists to indicate whether certain primary radio connections are normally persistent for a time period longer that this time parameter. For those primary radio connections that are normally persistent, the secondary radio may be turned on immediately based on the expectation that the device will not normally move away from that primary radio connection very soon.

Figure 2B:
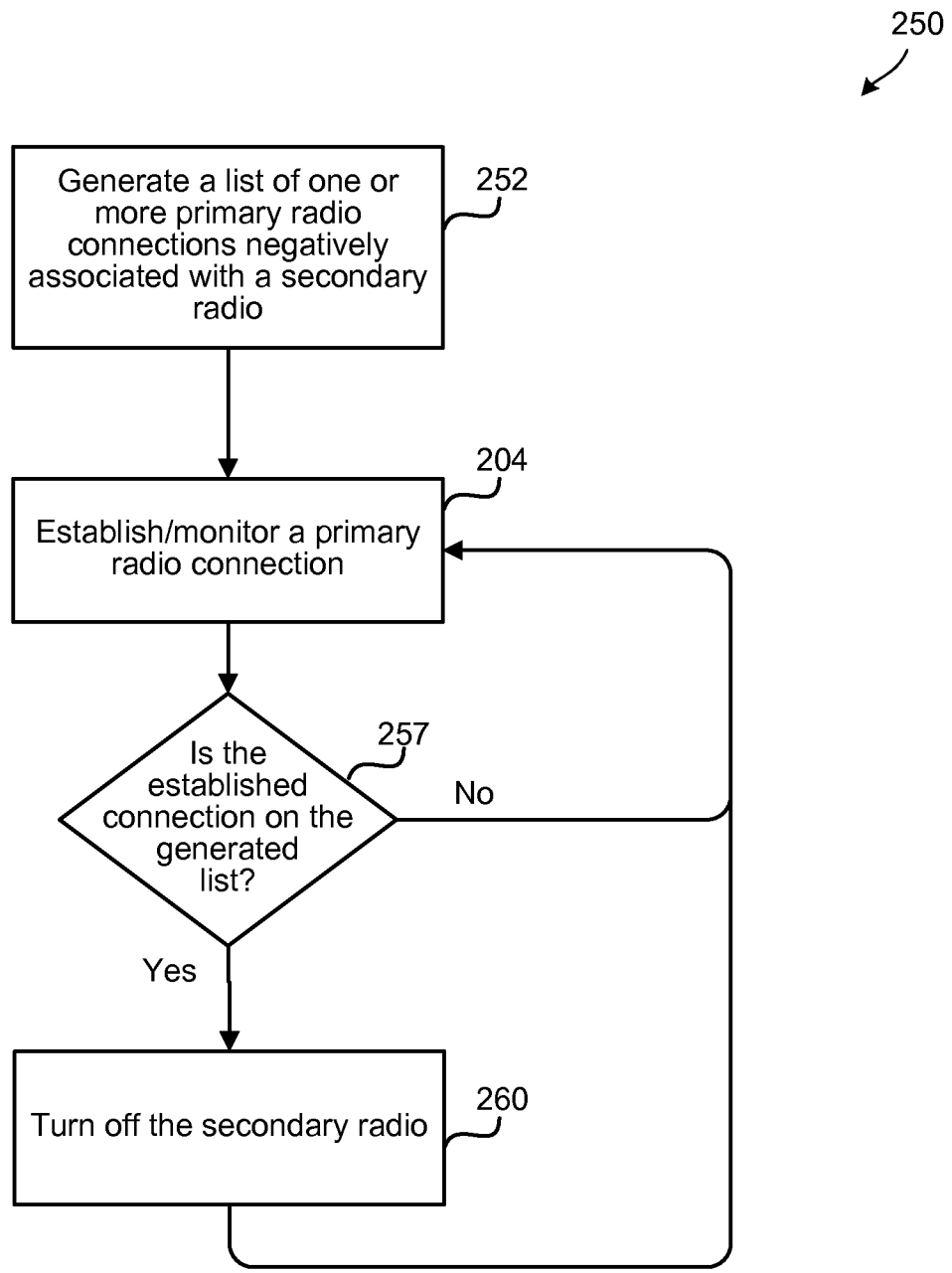

FIG. 2B illustrates another embodiment method 250 similar to method 200, except that primary radio connections 130 included on the list are negatively associated with the availability of second radio connections 120. In other words, the information obtained from the primary radio connection can be used to determine when secondary radio networks are not available. In step 252, a list is generated of primary radio connections for which there is no corresponding second radio 112. For example, if a primary radio connection 130 is established and no secondary radio connections 120 are available or desired by the user, then the primary radio connection may be included on the list. Again, the list may be represented in a variety of data structures, and the information stored on the list may be an identifier unique to that connection 130 or location.

In various embodiments, the communication device may have stored on it parameters to control whether the device occasionally rechecks the availability of secondary radio connections in association with primary radio connections that are encountered frequently and persistently. For example, if the communication device encounters certain primary radio connections frequently and persistently, but previous information indicates that secondary radio connections are not available, it may be beneficial for the device to re-check occasionally in case secondary radio connections may have become available since the last check.

A primary radio connection may be established in step 204. The communication device processor may determine whether the established connection is on the list in step 257. If the established connection is on the list (i.e., determination step 257=Yes), then the secondary radio 112 may be turned off in step 260. If the established connection is not on the list (i.e., determination step 257=No), then the device processor may continue monitoring primary radio connections by returning to step 204.

In various embodiments, after a secondary radio is turned "on" and a connection established, the communication device may also turn "off" the primary radio while the secondary radio is connected to further conserve energy. In further embodiments, the determination of whether to turn off the primary radio may be a function of whether the secondary radio connection is able to provide all of the same communications services that are provided by the primary radio connection and/or the communications services that are currently or recently being used by the secondary radio. The primary radio may be turned back "on" if the secondary radio connection is lost.

Figure 3:
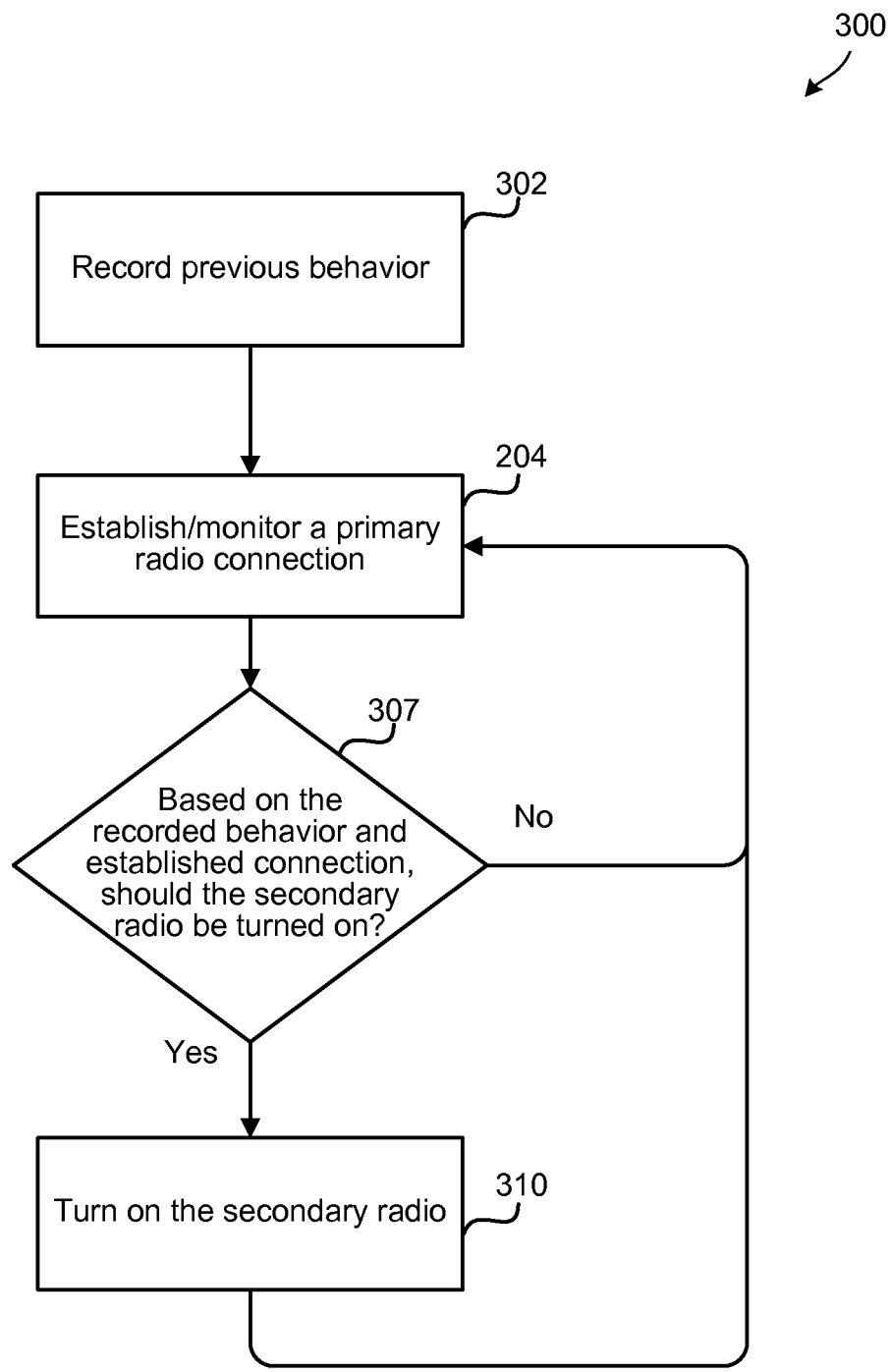
FIG. 3 is a process flow diagram of a method for controlling a secondary radio based on a primary radio in accordance with various embodiments.

Additional factors may be relied on to determine whether to turn the second radio 112 on or off, such as in a hysteresis analysis. FIG. 3 illustrates an embodiment method 300 that can rely on other previously recorded behavior or states of the device in determining whether to activate the secondary radio. In step 302, any previous behavior or states to be relied on are recorded. A primary radio connection may be established in step 204 just as in methods 200 and 250.

The communication device processor may determine whether the secondary radio 112 should be turned on based on the established primary radio connection and the recorded behavior in determination step 307. As a non-limiting example, a determination may consider lists such as in methods 200 and 250, and consider the previous states of the device, such as whether the second radio has been on or off in the past. For example, if the secondary radio has been flickering on and off rapidly, it may just leave the secondary radio on.

If the communication device processor determines that the secondary radio should be on (i.e., determination step 307=Yes), then the secondary radio 112 may be turned on in step 310. If the communication device processor determines that the secondary radio should be off (i.e., determination step 307=No), then the device processor may continue monitoring primary radio connections by returning to step 204.

Figure 4A:
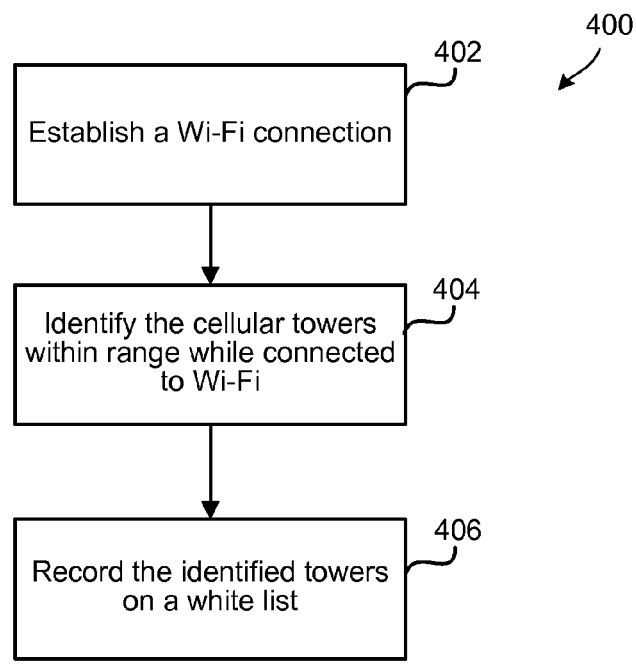
FIG. 4A is a process flow diagram of an embodiment method for generating a white list of primary radio connections.
Figure 4B:
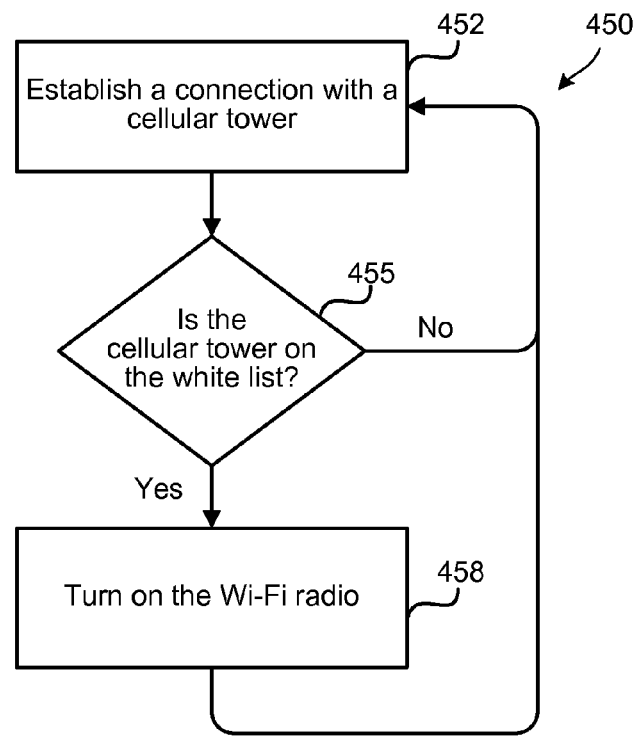
FIG. 4B is a process flow diagram of a method for controlling a secondary radio based on a primary radio and the white list in accordance with various embodiments.

Exemplary embodiment methods that may be implemented on a cellular telephone device (e.g., a smart phone) are shown in FIGS. 4A and 4B. FIG. 4A illustrates an embodiment method 400 in which a communication device 102 may generate or discover a list of connections 130 which when established indicate that a second radio network (e.g., Wi-Fi) may be available. In step 402, the secondary radio 112 may establish a Wi-Fi connection 120 (or other type of secondary radio connection). Any primary radio connections 130 established or available may be identified in step 404. For example, the identifier of any connected cellular tower 132 may used as an identifier for the connection or location. Cell tower identifiers (or other transmitter identifying information) may be recorded on a "white list" of primary radio connections 130 which are positively associated with secondary radio connection availability in step 406. Method 400 may be repeated whenever a Wi-Fi connection 120 is established to add more identifiers and actively develop or update the white list.

FIG. 4B illustrates an embodiment method 450 for controlling a second radio 112 based on the white list generated by method 400. The primary radio 110 may establish a cellular connection 130 with a cellular tower 132 in step 452. The cellular tower may provide an identifier as part of establishing this connection. The communication device processor may determine whether the identifier for the cellular tower 132 is on the white list in step 455. If the identifier matches a value on the list (i.e., determination step 455=Yes), then the secondary radio 112 may be turned on in step 458. If the identifier does not match an entry on the list (i.e., determination step 455=No), the secondary radio may remain de-energized and the method may repeated by the device processor the next cellular connection to be established.

Figure 5A:
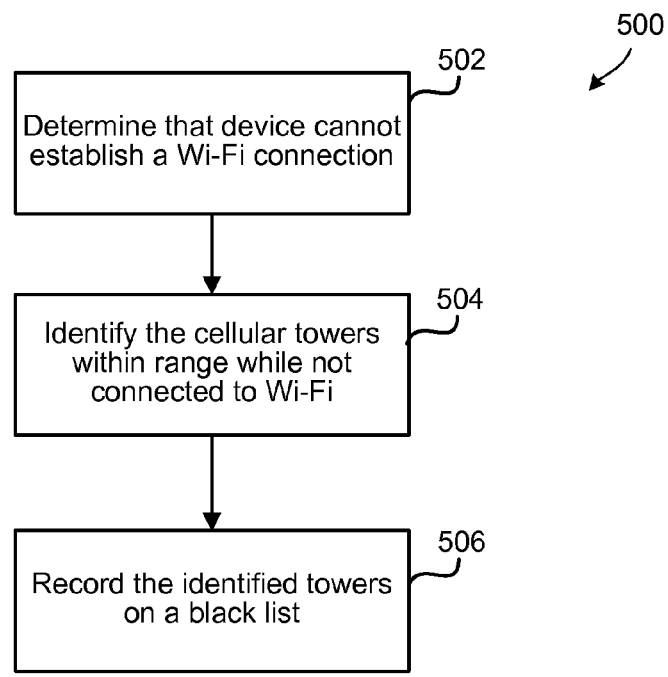
FIG. 5A is a process flow diagram of an embodiment method for generating a black list of primary radio connections.
Figure 5B:
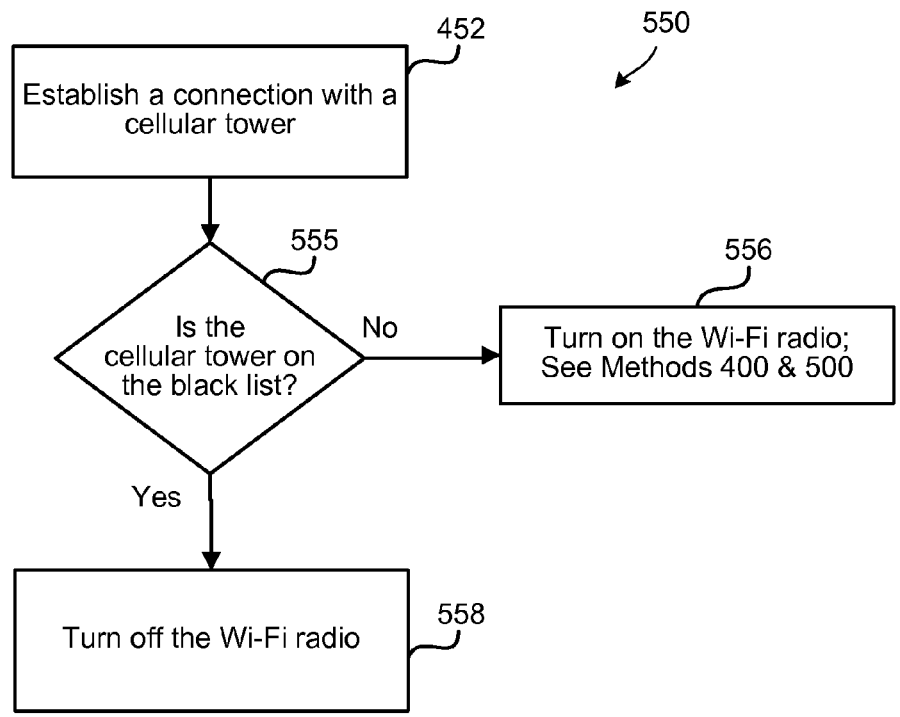
FIG. 5B is a process flow diagram of a method for controlling a secondary radio based on a primary radio and a black list in accordance with various embodiments.

FIGS. 5A and 5B are similar to FIGS. 4A and 4B, except that they employ a "black list" which records primary connection information that is negatively correlated with the availability of a second radio connection. FIG. 5A illustrates an embodiment method 500 by which a device 102 may generate or discover a list of connections 130 which when established indicate that there is no secondary radio network availability. In step 502, communication device processor may determine that a secondary radio network (e.g., a Wi-Fi connection) could not be established. Any primary radio connections 130 established or available at that time may be identified in step 504. For example, the cell tower identifier for a current primary radio connection 130 may be obtained. The cell tower identifier(s) (or other connection information) may be recorded on a "black list" of primary radio connections 130 negatively associated with secondary radio connection availability in step 506. Method 500 may be repeated whenever a new primary radio connection is established and a Wi-Fi connection 120 is not available to add more identifiers and actively develop or update the black list.

The secondary radio may be turned off when it has determined that no secondary radio connection is available and remain off so long as the primary radio remains connected to or in communication with the same primary radio connection (e.g., the connected cell tower ID does not change). When the primary radio connection changes, method 450 may be repeated. Also, even if the new primary connection information (e.g., cell tower ID) is not on the white list, the secondary radio may be turned on so the communication device processor can repeat methods 400 and 500 in order to build up the white and black lists.

In various embodiments, the second radio 112 may have to fail multiple times in attempts to establish connections before cell tower identifiers are added to the black list. In further embodiments, a user rejection of all available Wi-Fi connections at a particular location may be treated as a failure to connect under step 502, in which case corresponding cell tower identifiers may be added to the black list despite the availability of second radio connections.

FIG. 5B illustrates an embodiment method 550 for controlling a second radio 112 based on the black list generated in method 500. The primary radio 110 may establish a cellular connection 130 with a cellular tower 132 in step 452. The cellular tower may provide an identifier as part of establishing this connection. The communication device processor may determine whether the identifier for the cellular tower 132 is on the black list in step 555. If the identifier matches a value on the list (i.e., determination step 555=Yes), then the secondary radio 112 may be turned off in step 558 (if it is on). If the identifier does not match an entry on the list (i.e., determination step 455=No), then the secondary radio may be turned on in step 556 to determine if a connection is available. If no connection is available, the communication device processor may perform methods 400 and 500 to update the white and black lists.

Figure 6A:
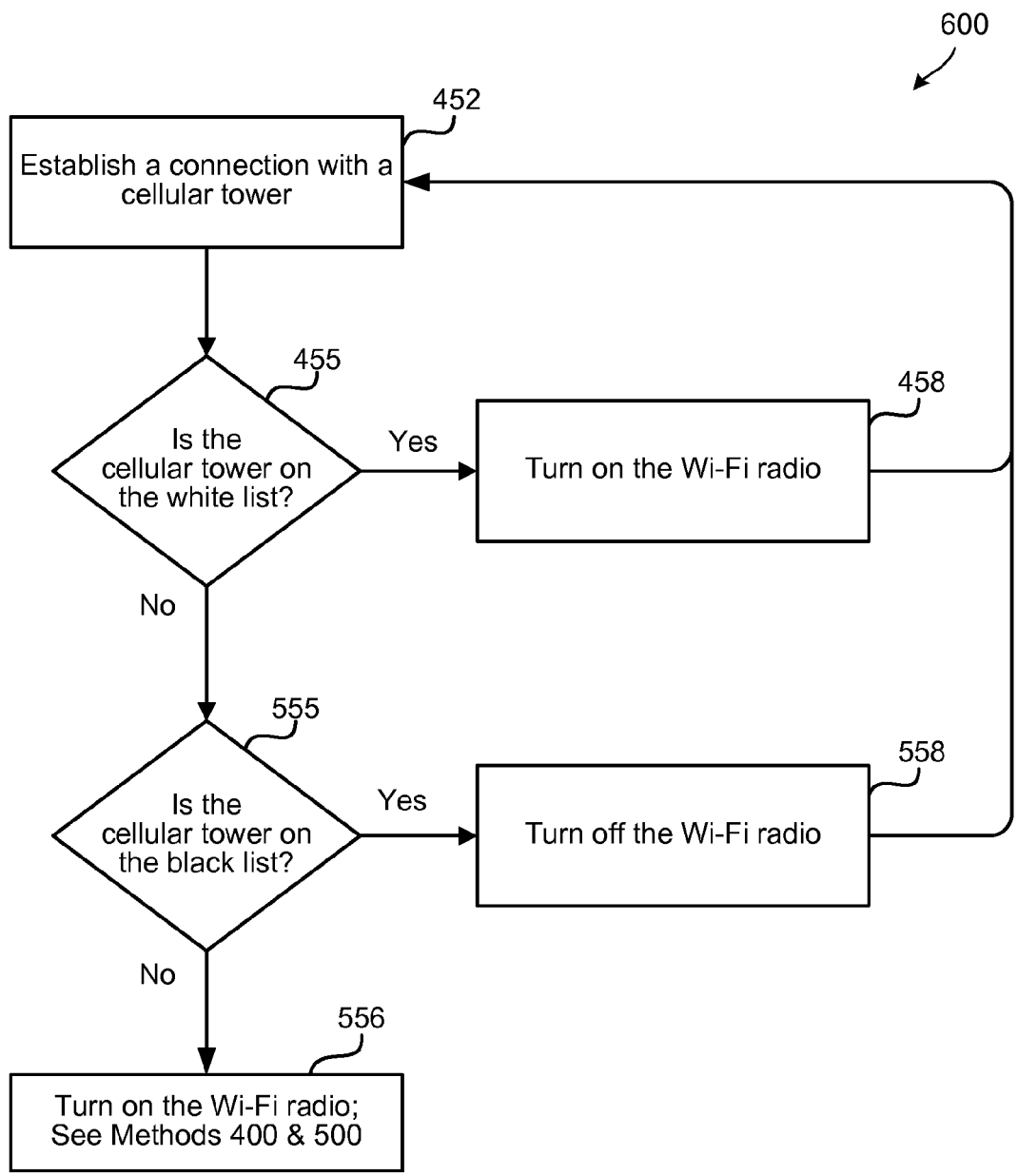
FIG. 6A is a process flow diagram of a method for controlling a secondary radio based on a white list and a black list in accordance with various embodiments.

A single communication device 102 may rely on both white and black lists. FIG. 6A illustrates an embodiment method 600 involving white and black lists. The primary radio 110 may establish a cellular connection 130 with a particular cellular tower 132 in step 452. The cellular tower may provide an identifier as part of establishing this connection. The communication device processor may determine whether the identifier for the cellular tower 132 is on the white list in determination step 455. If the identifier matches an entry on the list (i.e., determination step 455=Yes), the secondary radio 112 may be turned "on" in step 458. If the identifier does not match one on the white list (i.e., determination step 455=No), the communication device processor may determine whether the identifier for the cellular tower 132 is on the black list in determination step 555. If the identifier matches an entry on the list (i.e., determination step 555=Yes), the secondary radio 112 may be turned "off" in step 558. If the primary radio connection identifier does not match an entry on either of the white or black list (i.e., determination step 455=No and determination step 555=No), the secondary radio may be turned "on" in step 556 to determine if a connection is available. If no connection is available, the communication device processor may perform methods 400 and 500 to update the white and black lists.

Thus, after white and black lists have been developed, the Wi-Fi radio 112 may be turned "on" and "off" automatically based on the current primary radio connections using the information stored in the lists. As the communication device 102 travels, new cellular tower connections may be established and the second radio 112 activated or deactivated accordingly.

Figure 6B:
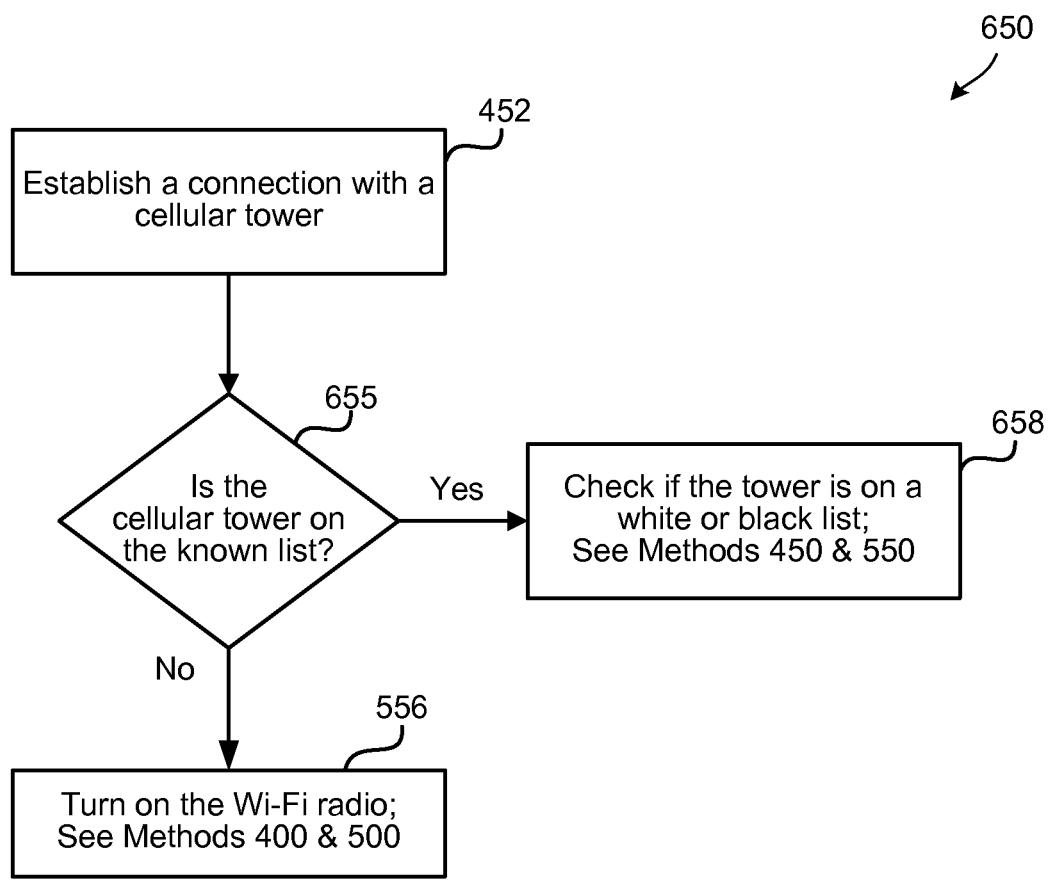
FIG. 6B is a process flow diagram of a method for controlling a secondary radio based on a known list in accordance with various embodiments.

FIG. 6B illustrates an embodiment method 650 that uses a known list. The known list may be a list of all primary radio connections previously established and checked for available secondary radio connections. The primary radio 110 may establish a cellular connection 130 with a particular cellular tower 132 in step 452. The communication device processor may determine whether an identifier for the cellular tower 132 is on the known list in determination step 655.

If the primary radio connection identifier matches an entry on the known list (i.e., determination step 655=Yes), the device may perform methods 450 or 550 to determine whether to turn on the secondary radio in step 658. If the primary radio connection identifier does not match an entry on the known list (i.e., determination step 655=No), the secondary radio may be turned "on" in step 556 to determine if a connection is available and the device may perform methods 400 and 500 to update the white and black lists accordingly.

The previous methods involve determinations based on a current primary radio connection, but further methods may be based on the loss of a primary radio connection. An example application of this alternative method is an asset tracking device, such as described above with reference to FIGS. 1B and 1C. In an embodiment asset tracking device, the device may be maintained in a low power state so long as a localized RF beacon is received or receivable. Since the range of the localized RF beacon is limited, continued reception of the beacon indicates that the asset being tracked remains within a predefined safe zone or expected operating area. Loss of the localized RF beacon (e.g., loss of connection or inability to establish connection) indicates that the asset is now outside of that predefined area, in which case it may be desirable to activate the secondary radio to establish a connection to a wide area network, such as a cellular telephone network.

Figure 7A:
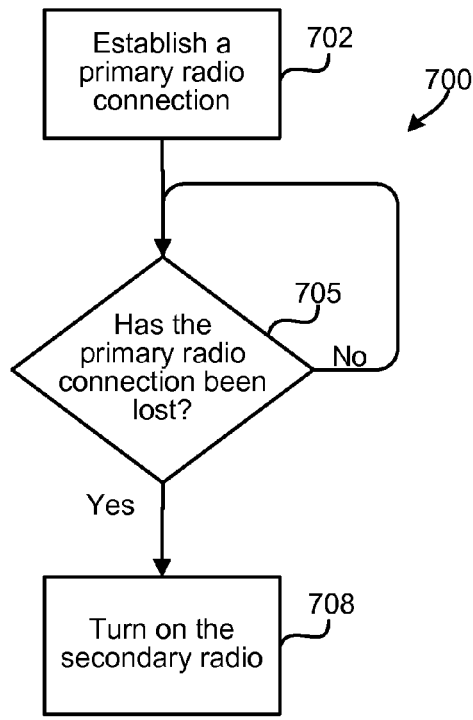
FIGS. 7A and 7B are process flow diagrams of methods for controlling a secondary radio based on losing or being unable to establish a connection to a primary radio in accordance with various embodiments.

FIG. 7A illustrates an embodiment method 700 that may be utilized by an asset tracking device. A primary radio connection 130 may be established and maintained in step 702, such as to the RF beacon. The communication device processor may determine whether the primary radio connection 130 has been lost in determination step 705. If the connection has been lost (i.e., determination step 705=Yes), then the secondary radio 112 may be turned on in step 708. If the primary radio connection has not been lost (i.e., determination step 705=No), the asset tracking device processor may check again whether the connection has been lost, with this loop repeating so long as the primary radio connection is maintained with the RF beacon. In various embodiments, there may be a delay (not shown but may be included as part of determination step 705) before rechecking whether the connection has been lost in order to conserve power.

Instead of activating the secondary radio upon loss of a primary radio connection, the asset tracking device may instead periodically activate the primary radio in order to determine whether the RF beacon can be received. This alternative embodiment further conserves power since the primary radio is only periodically energized. Depending upon the nature and risk to the asset, the duration between activations may be adjusted in order to balance power drain against the potential delay in detecting movement of the track asset.

Figure 7B:
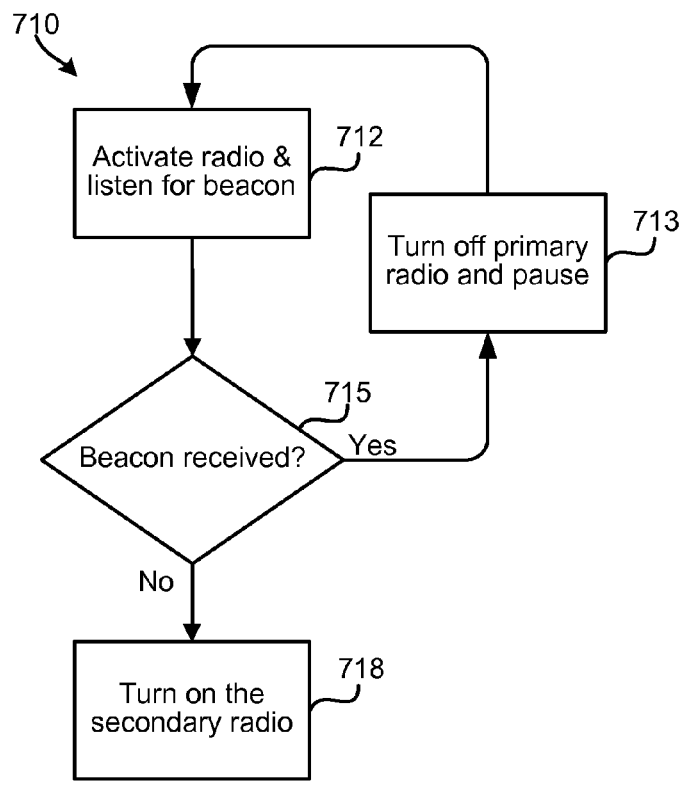

FIG. 7B illustrates an embodiment method 710 that may be utilized by an asset tracking device in which the primary radio is activated periodically. In step 712, a processor of the asset tracking device may activate the primary radio at a predetermined interval so that the radio can attempt to receive the RF beacon signal. In determination step 715, the device processor may determine whether the primary radio is receiving the beacon. If the beacon can be received (i.e., determination step 715=Yes), the device processor may turn off the primary radio and pause for a predetermined duration, before returning to step 712 to repeat the activation and monitoring process. If the beacon cannot be received (i.e., determination step 715=No), the device processor may turn on the secondary radio in step 718. With the secondary radio activated, the position reporting and/or alarm functions of the tracking device may be performed.

Figure 8:
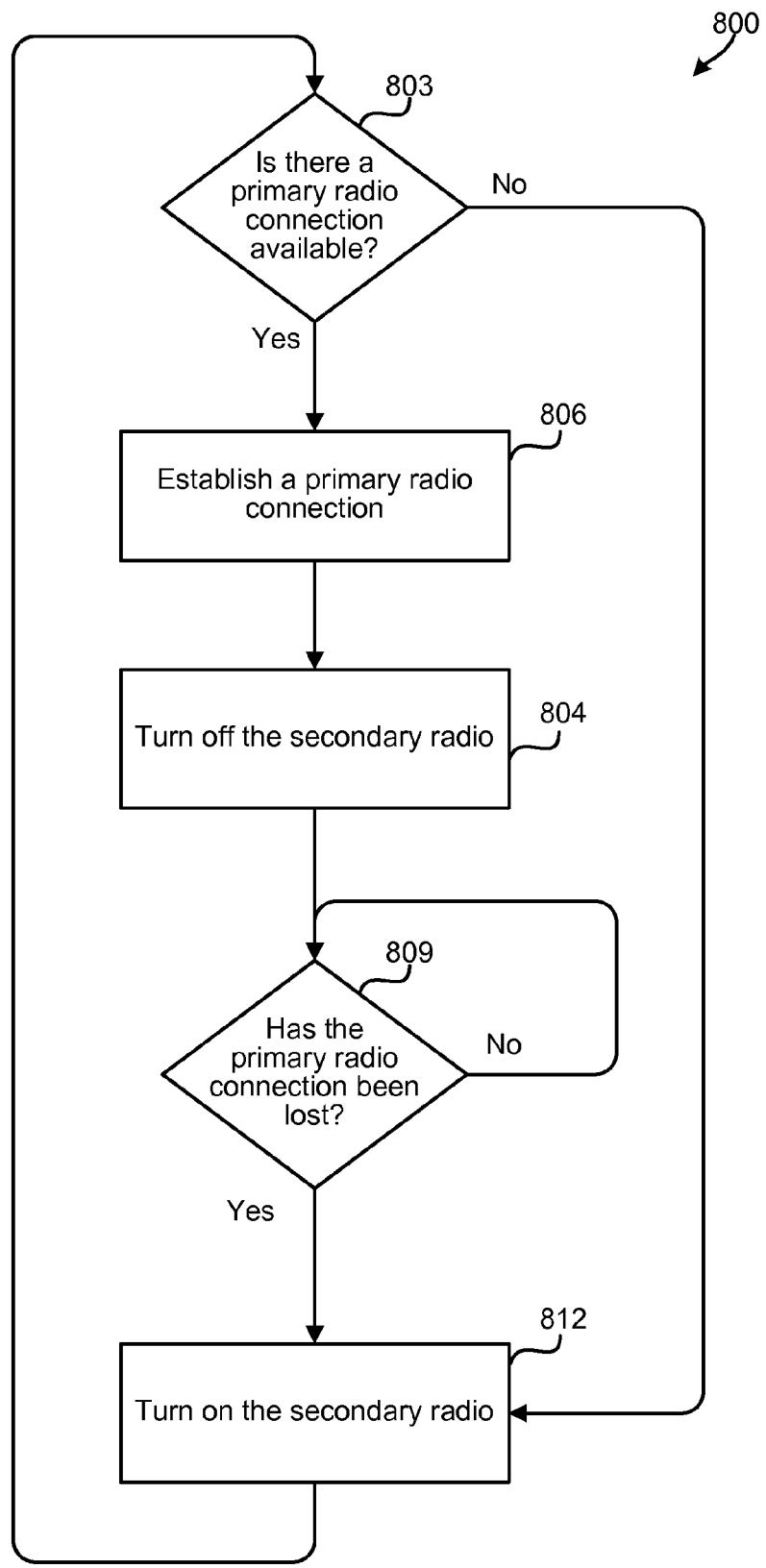
FIG. 8 is a process flow diagram of a method for controlling a secondary radio based on losing a connection to a primary radio in accordance with various embodiments.

FIG. 8 illustrates an embodiment method 800 that may allow multiple primary radio connections to be monitored by a communication device and used in determining whether a secondary radio should be activated. In step 803, the communication device processor may determine whether a primary radio connection is available. If a primary radio connection is not available (i.e., determination step 803=No), then the secondary radio 112 may be turned on in step 812. If a primary radio connection is available (i.e., determination step 803=Yes), then a primary radio connection may be established in step 806. If the secondary radio is on, it may be turned off in step 804. The communication device processor may determine whether the primary radio connection 130 has been lost in step 809. If the connection has been lost (i.e., determination step 809=Yes), then the secondary radio 112 may be turned on in step 812. If the primary radio connection has not been lost (i.e., determination step 809=No), then communication device processor may return to determination block 803 to check again whether the connection has been lost. In various embodiments, there may be a delay (not shown) before rechecking whether the connection has been lost in order to conserve power.

In further embodiments, neither the primary nor the secondary radio may be on unless triggered by some external event. For example, the device 102 may include an accelerometer, and the communication device 102 may be configured such that the primary and secondary radios remain off so long as there is no motion detected by the accelerometer. If a significant acceleration is detected, one or both of the primary and secondary radios may be activated.

Figure 9:
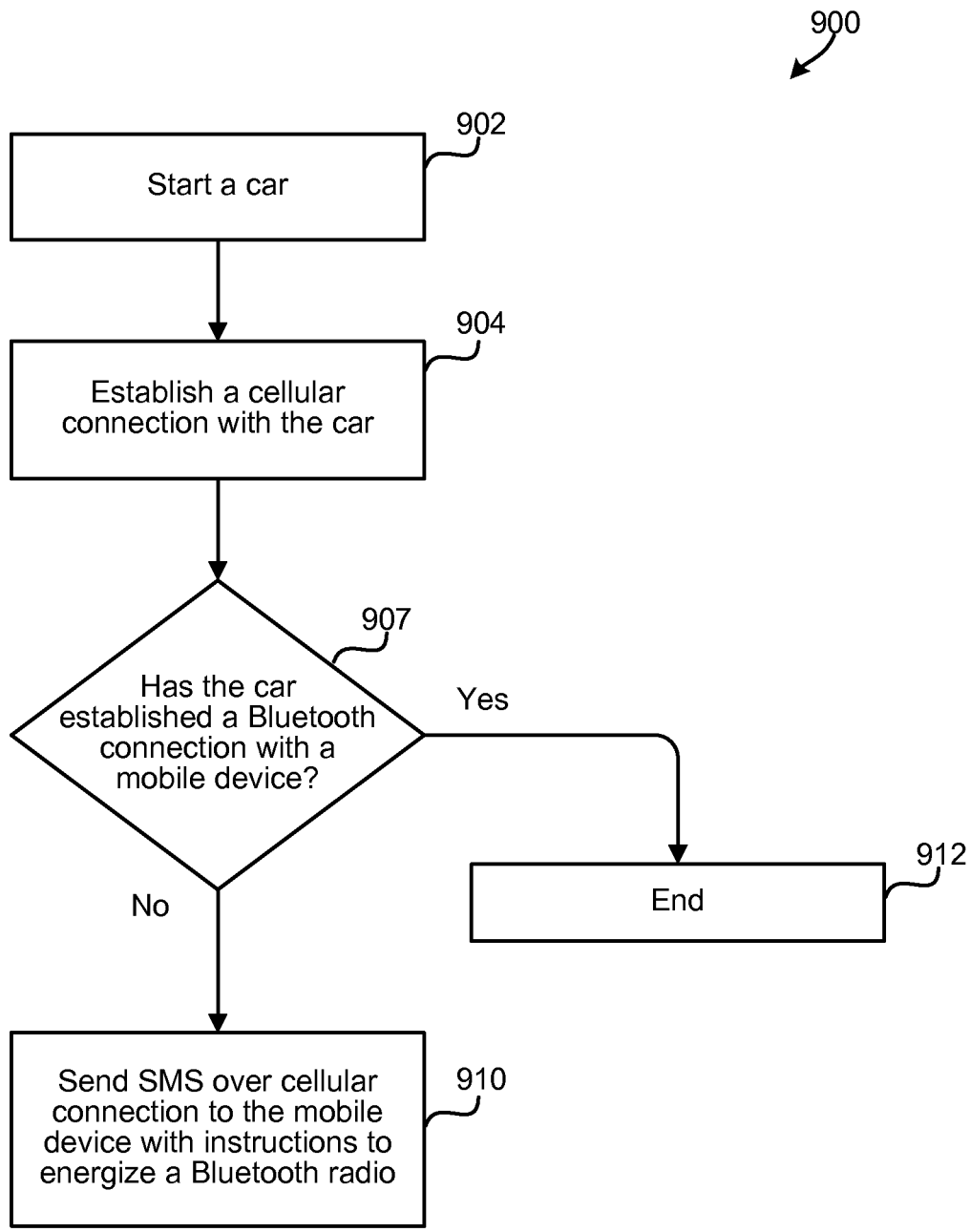
FIG. 9 is a process flow diagram of a method for controlling a secondary radio based on a primary radio in accordance with various embodiments.

An exemplary embodiment method 900 involving a car and a communication device 102 is shown in FIG. 9. This method 900 may be useful for vehicles which include a Bluetooth or other type of wireless communication link with a user's smart phone. In method 900, a car or other vehicle may be started in step 902. The car or other vehicle may establish a connection to a cellular communication network in step 904. The vehicle processor may determine whether the car has established a Bluetooth connection with a communication device 102 in determination step 907. If the vehicle has established a Bluetooth connection with a communication device (i.e., determination step 907=Yes), then method 900 may terminate in step 912. If the vehicle has not established a Bluetooth connection with the communication device (i.e., determination step 907=No), the vehicle processor may send a message, such as an SMS message, over the cellular connection to the communication device with instructions to energize the communication device's Bluetooth radio to establish a connection in step 910. The communication device may receive the message from the vehicle on a primary radio, such as its cellular network transceiver. The communication device may determine whether to energize the secondary radio (i.e. the Bluetooth radio) based on the received message.

The communication device might determine that it is moving relatively rapidly (e.g., moving at automotive speeds) based on various sensing methods. For example, rapid changes in the received primary radios can indicate that the device is moving through radio coverage areas rapidly, indicating travel speeds which are likely associated with movement in a vehicle. Alternatively, if the communication device has a GPS receiver that is "on", that receiver or information from the receiver may determine whether current travel speeds are consistent with movement in a vehicle. Finally, if the communication device includes an accelerometer, a processor receiving signals from the accelerometer may determine whether the acceleration levels (and/or inferred speeds) are consistent with those of a moving vehicle. Any such method that can be used to determine with relatively high probability that the communication device is in a moving vehicle may be used to turn on the secondary radio and check for availability of a connection to a secondary radio, such as Bluetooth.

In various embodiments, other secondary radios 112 may be energized based on information obtained by a primary radio. In further embodiments, a vehicle processor may determine which communication device to send a message based on various identifying features. For example, a key used to start the car may be associated with a particular user's communication device.

Figure 10:
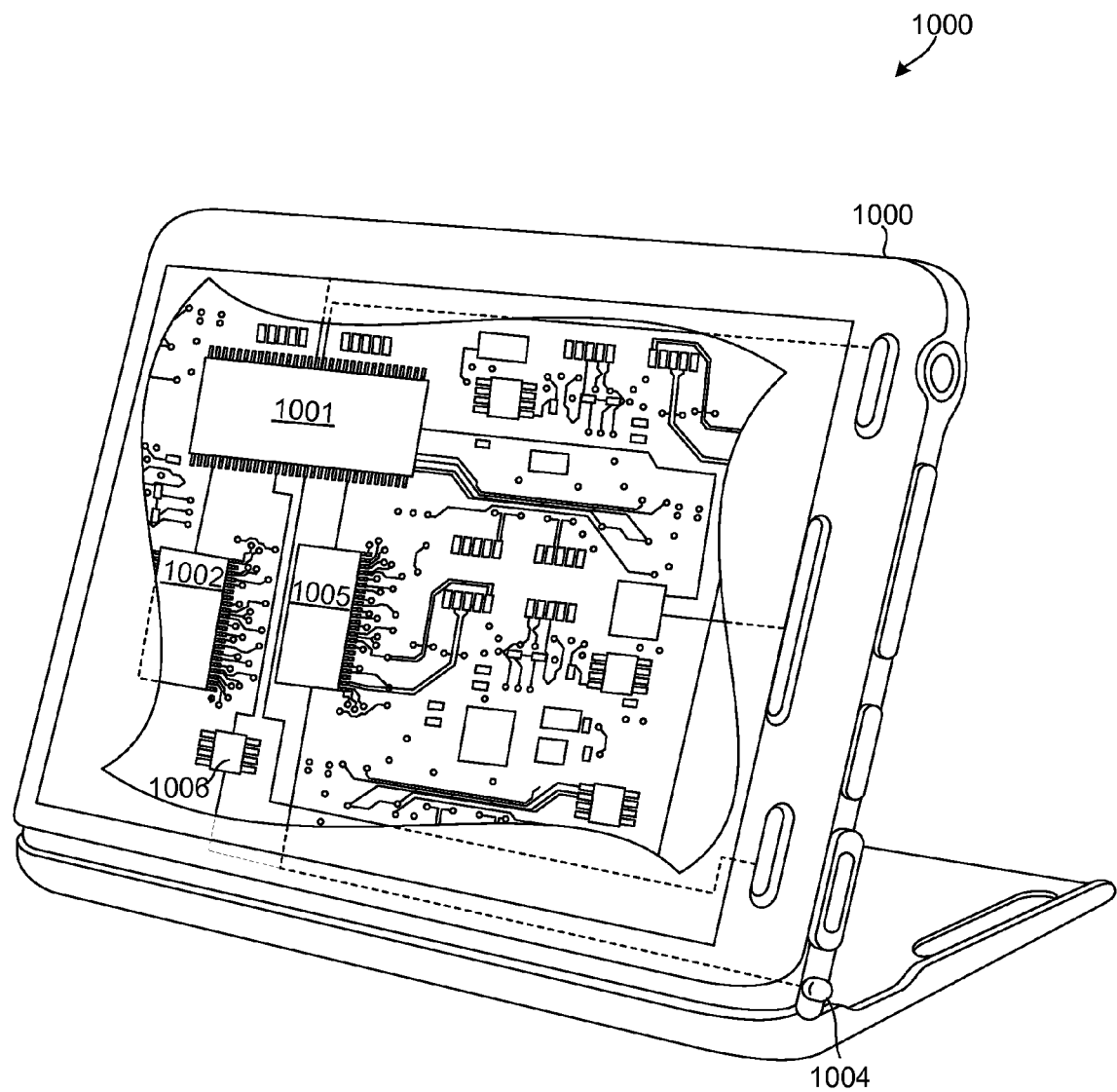
FIG. 10 is a component block diagram of a mobile device suitable for use with the various embodiments.

The various embodiments may also be implemented on a variety of mobile communication devices, such as the mobile device 1000 illustrated in FIG. 10. For example, an exemplary mobile receiver device 1000 may include a processor 1001 coupled to internal memory 1002, a first radio transceiver 1005 (e.g., a cellular network transceiver), and to a second radio transceiver 1008 (e.g., a WiFi, Bluetooth®, Zigbee® or other radio). Additionally, first and second radios 1005, 1008 may be coupled to an antenna 1004 for sending and receiving electromagnetic radiation.

The processor 1001 may be any programmable microprocessor, microcomputer or multiple processor chip or chips that can be configured by processor-executable software instructions (applications) to perform a variety of functions, including the functions of the various aspects described herein. Typically, software applications and processor-executable instructions may be stored in the internal memory 1002 before they are accessed and loaded into the processor 1001. The processor 1001 may include internal memory sufficient to store the application software instructions. In some mobile devices, a secure memory 1006 may be in a separate memory chip coupled to the processor 1001. In many mobile devices 500, the internal memory 1002 may be a volatile or nonvolatile memory, such as flash memory, or a mixture of both. For the purposes of this description, a general reference to memory refers to all memory accessible by the processor 1001, including internal memory 1002, removable memory plugged into the mobile device, and memory within the processor 1001 itself.

The foregoing method descriptions and the process flow diagrams are provided merely as illustrative examples and are not intended to require or imply that the steps of the various embodiments must be performed in the order presented. As will be appreciated by one of skill in the art, the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in processor-executable instructions or a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of using information from a first radio in a device to control a second radio in the device, comprising:
obtaining information regarding a first radio network from the first radio by obtaining an identifier of a cellular telephone network tower in communication with the first radio;
determining whether the second radio should be connected to a second radio network based on the obtained information regarding the first radio network by comparing the obtained identifier to a list of identifiers stored in memory to determine if there is a match;
energizing or deenergizing the second radio based on whether the obtained identifier matches a value stored in memory;
attempting to establish a connection with the second radio;
obtaining an identifier of a cellular telephone network tower in communication with the first radio when no connection can be established with the second radio; and
recording the obtained identifier in memory.

2. The method of claim 1, further comprising:
obtaining an identifier of a cellular telephone network tower in communication with the first radio when the connection can be established with the second radio network; and
recording the obtained identifier in memory.

3. The method of claim 1, wherein the first radio is a cellular telephone transceiver and the second radio is one of a Wi-Fi transceiver and Bluetooth® transceiver.

4. The method of claim 1, wherein:
obtaining information regarding a first radio network from the first radio comprises:
receiving a message on the first radio; and
obtaining information from within the message; and
determining whether the second radio should be connected to a second radio network based on the obtained information regarding the first radio network is further based on the information obtained from within the message.

5. A method of using information from a first radio in a device to control a second radio in the device, comprising:
obtaining information regarding a first radio network from the first radio by obtaining an identifier of a cellular telephone network tower in communication with the first radio;
determining whether the second radio should be connected to a second radio network based on the obtained information regarding the first radio network by comparing the obtained identifier to a list of identifiers stored in memory to determine if there is a match in the list; and
energizing or deenergizing the second radio based on whether the obtained identifier matches a value stored in memory;
attempting to establish a connection with the second radio network when there is no match in the list; and
recording the obtained identifier in memory based on whether the attempted connection is established.

6. A device, comprising:
a first radio configured to communicate with a first radio network;
a second radio configured to communicate with a second radio network;
a memory; and
a processor coupled to the memory, the first radio, and the second radio and configured with processor-executable instructions to perform operations comprising:
obtaining information regarding the first radio network from the first radio by obtaining an identifier of a cellular telephone network tower in communication with the first radio;
determining whether the second radio should be connected to the second radio network based on the obtained information regarding the first radio network by comparing the obtained identifier to a list of identifiers stored in memory to determine if there is a match;
energizing or deenergizing the second radio based on whether the obtained identifier matches a value stored in memory;
attempting to establish a connection with the second radio;
obtaining an identifier of a cellular telephone network tower in communication with the first radio when no connection can be established with the second radio; and
recording the obtained identifier in memory.

7. The device of claim 6, wherein the processor is configured with processor executable instructions further comprising:
obtaining an identifier of a cellular telephone network tower in communication with the first radio when the connection can be established with the second radio network; and
recording the obtained identifier in memory.

8. The device of claim 6, wherein the first radio is a cellular telephone transceiver and the second radio is one of a Wi-Fi transceiver and Bluetooth® transceiver.

9. The device of claim 6, wherein the processor is configured with processor executable instructions such that:
obtaining information regarding a first radio network from the first radio comprises:
receiving a message on the first radio; and
obtaining information from within the message; and
determining whether the second radio should be connected to a second radio network based on the obtained information regarding the first radio network is further based on the information obtained from within the message.

10. A device, comprising:
a first radio configured to communicate with a first radio network;
a second radio configured to communicate with a second radio network;
a memory; and
a processor coupled to the memory, the first radio, and the second radio and configured with processor-executable instructions to perform operations comprising:
obtaining information regarding the first radio network from the first radio by obtaining an identifier of a cellular telephone network tower in communication with the first radio;
determining whether the second radio should be connected to the second radio network based on the obtained information regarding the first radio network by comparing the obtained identifier to a first list of identifiers stored in memory to determine if there is a match;
comparing the obtained identifier to a second list of identifiers stored in memory to determine if there is a match when there is a match in the first list; and
energizing or deenergizing the second radio based on whether the obtained identifier matches a value stored in memory;
attempting to establish a connection with the second radio network when there is no match in the list; and
recording the obtained identifier in memory based on whether the attempted connection is established.

11. A device, comprising:
a first radio configured to connect to a first radio network;
a second radio configured to connect to a second radio network;
means for obtaining information regarding the first radio network from the first radio, further comprising means for obtaining an identifier of a cellular telephone network tower in communication with the first radio;

means for determining whether the second radio should be connected to the second radio network based on the obtained information regarding the first radio network, further comprising means for comparing the obtained identifier to a list of identifiers stored in memory to determine if there is a match;
means for energizing or deenergizing the second radio based on whether the obtained identifier matches a value stored in memory;
means for attempting to establish a connection with the second radio;
means for obtaining an identifier of a cellular telephone network tower in communication with the first radio when no connection can be established with the second radio; and
means for recording the obtained identifier in memory.

12. The device of claim 11, further comprising:
means for obtaining an identifier of a cellular telephone network tower in communication with the first radio when the connection can be established with the second radio network; and
means for recording the obtained identifier in memory.

13. The device of claim 11, wherein the first radio is a cellular telephone transceiver and the second radio is one of a Wi-Fi transceiver and Bluetooth® transceiver.

14. The device of claim 11, wherein:
means for obtaining information regarding a first radio network from the first radio comprises:
means for receiving a message on the first radio; and
means for obtaining information from within the message; and
means for determining whether the second radio should be connected to a second radio network based on the obtained information regarding the first radio network comprises means for determining whether the second radio should be connected to a second radio network based on the obtained information regarding the first radio network further based on the information obtained from within the message.

15. A device, comprising:
a first radio configured to connect to a first radio network;
a second radio configured to connect to a second radio network;
means for obtaining information regarding the first radio network from the first radio, further comprising means for obtaining an identifier of a cellular telephone network tower in communication with the first radio;
means for determining whether the second radio should be connected to the second radio network based on the obtained information regarding the first radio network further comprising means for comparing the obtained identifier to a first list of identifiers stored in memory to determine if there is a match;
means for comparing the obtained identifier to a second list of identifiers stored in memory to determine if there is a match when there is a match in the first list; and
means for energizing or deenergizing the second radio based on whether the obtained identifier matches a value stored in memory;
means for attempting to establish a connection with the second radio network when there is no match in the list; and
means for recording the obtained identifier in memory based on whether the attempted connection is established.

16. A non-transitory storage medium having stored thereon processor-executable software instructions configured to cause a processor within a device to perform operations comprising:
obtaining information regarding a first radio network from the first radio by obtaining an identifier of a cellular telephone network tower in communication with the first radio;
determining whether the second radio should be connected to a second radio network based on the obtained information regarding the first radio network by comparing the obtained identifier to a list of identifiers stored in memory to determine if there is a match;
energizing or deenergizing the second radio based on whether the obtained identifier matches a value stored in memory;
attempting to establish a connection with the second radio;
obtaining an identifier of a cellular telephone network tower in communication with the first radio when no connection can be established with the second radio; and
recording the obtained identifier in memory.

17. The non-transitory storage medium of claim 16, wherein the stored processor-executable instructions are configured to cause a processor within a device to perform operations further comprising:
obtaining an identifier of a cellular telephone network tower in communication with the first radio when the connection can be established with the second radio network; and
recording the obtained identifier in memory.

18. The non-transitory storage medium of claim 16, wherein the first radio is a cellular telephone transceiver and the second radio is one of a Wi-Fi transceiver and Bluetooth® transceiver.

19. The non-transitory storage medium of claim 16, wherein the stored processor-executable instructions are configured to cause a processor within a device to perform operations such that:
obtaining information regarding a first radio network from the first radio comprises:
receiving a message on the first radio; and
obtaining information from within the message; and
determining whether the second radio should be connected to a second radio network based on the obtained information regarding the first radio network is further based on the information obtained from within the message.

20. A non-transitory storage medium having stored thereon processor-executable software instructions configured to cause a processor within a device to perform operations comprising:
obtaining information regarding a first radio network from the first radio, further comprising obtaining an identifier of a cellular telephone network tower in communication with the first radio;
determining whether the second radio should be connected to a second radio network based on the obtained information regarding the first radio network by comparing the obtained identifier to a first list of identifiers stored in memory to determine if there is a match;
comparing the obtained identifier to a second list of identifiers stored in memory to determine if there is a match when there is a match in the first list; and
energizing or deenergizing the second radio based on whether the obtained identifier matches a value stored in memory;
attempting to establish a connection with the second radio network when there is no match in the list; and recording the obtained identifier in memory based on whether the attempted connection is established.

* * * * *